United States Patent [19]

McCullen et al.

[11] Patent Number: 4,828,812

[45] Date of Patent: May 9, 1989

[54] TITANOSILICATES OF ENHANCED ION EXCHANGE CAPACITY AND THEIR PREPARATION

[75] Inventors: Sharon B. McCullen, Newtown, Pa.; Nai Y. Chen, Titusville; Scott Han, Lawrenceville, both of N.J.

[73] Assignee: Mobil Oil Corporation, New York, N.Y.

[21] Appl. No.: 138,972

[22] Filed: Dec. 29, 1987

[51] Int. Cl.$^4$ .................. C01B 33/20; C01G 23/04
[52] U.S. Cl. .................. 423/326; 423/328; 423/598
[58] Field of Search ............ 423/326, 328, 329, 118, 423/598; 502/25, 85; 210/660, 670

[56] References Cited

U.S. PATENT DOCUMENTS

| | | | |
|---|---|---|---|
| 3,329,481 | 7/1967 | Young | 23/111 |
| 3,374,182 | 3/1968 | Young | 423/328 |
| 3,382,039 | 5/1968 | Calmon et al. | 423/118 |
| 3,878,128 | 4/1975 | Rosback | 423/328 |
| 3,878,129 | 4/1975 | Rosback | 423/328 |
| 4,329,328 | 5/1982 | McAnespie et al. | 423/326 |
| 4,410,501 | 10/1983 | Taramasso et al. | 423/326 |
| 4,519,998 | 5/1985 | Leen | 423/277 |
| 4,559,315 | 12/1985 | Chang et al. | 502/85 |
| 4,576,805 | 3/1986 | Chang et al. | 423/326 |
| 4,623,526 | 11/1986 | Leen | 423/277 |
| 4,666,692 | 5/1987 | Taramasso et al. | 423/328 |
| 4,666,693 | 5/1987 | Ross et al. | 423/328 |

FOREIGN PATENT DOCUMENTS 0265578 10/1927 United Kingdom ............... 423/328

OTHER PUBLICATIONS

Naccache et al., "Transition Metal Exchanged Zeolites:Physical and Catalytic Properties" from Zeolites:-Science and Technology, Ed. Ribeiro et al.; Martinos Nijhoff Pub., 1984, pp. 373–396.
U.S. Application Ser. No. 138,973 Filed 12/29/87.
U.S. Application Ser. No. 138,974 Filed 122987.

Primary Examiner—John Doll
Assistant Examiner—R. Bruce Breneman
Attorney, Agent, or Firm—Alexander J. McKillop; Charles J. Speciale; Dennis P. Santini

[57] ABSTRACT

A method for increasing ion exchange capacity of a titanosilicate comprises contacting the titanosilicate with aqueous alkaline solution having a pH ranging from 7 to 10. The resulting material is especially useful as a support for highly dispersed noble metal.

14 Claims, 1 Drawing Sheet

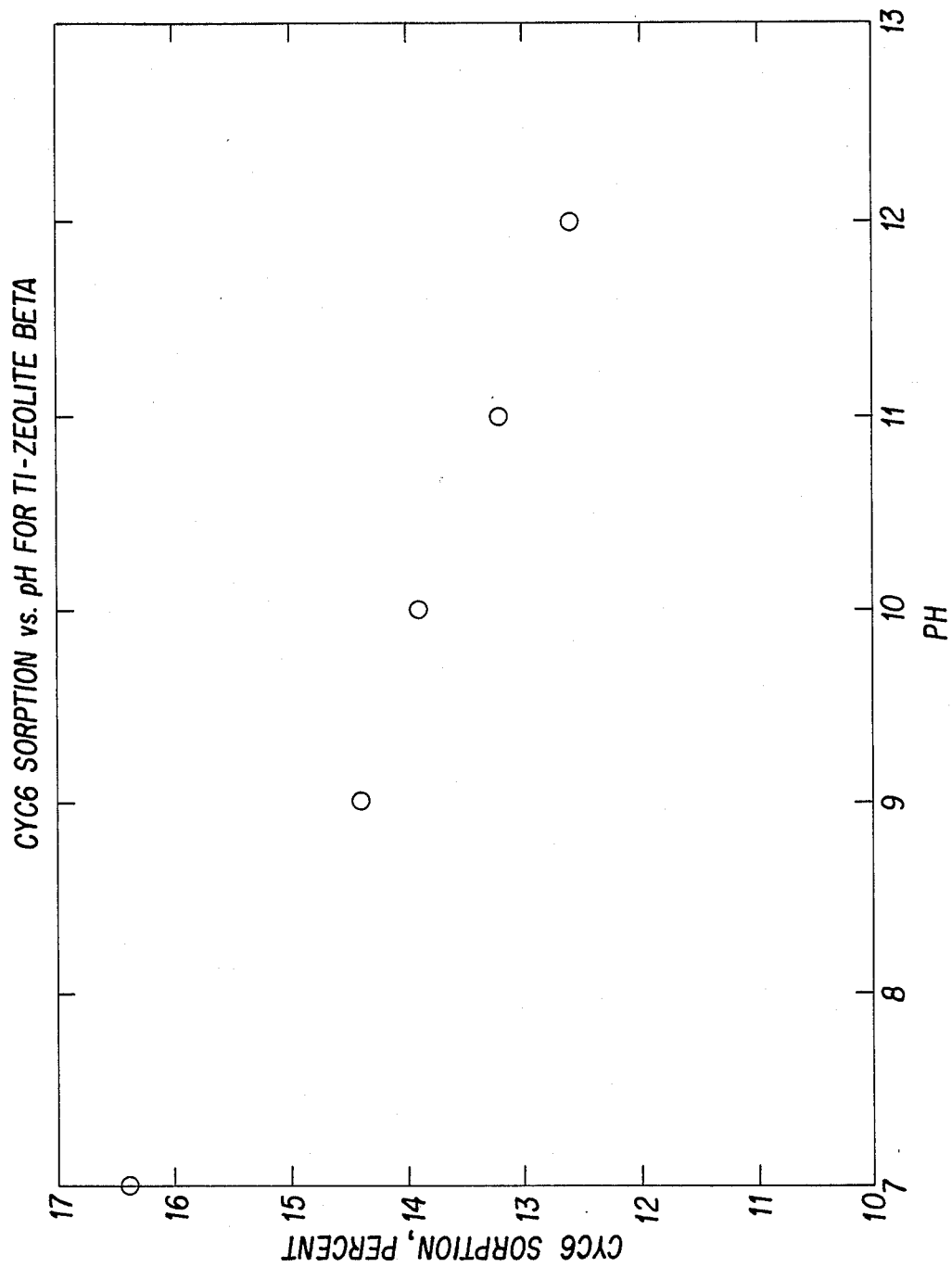

TITANOSILICATES OF ENHANCED ION EXCHANGE CAPACITY AND THEIR PREPARATION

The present invention relates to low acidity, high exchange capacity titanosilicate materials, their method of preparation and their use as noble metal supports. This invention further relates to the use of these materials as catalysts in hydrocarbon processing, e.g., in aromatization reactions, including paraffin dehydrocyclization and naphtha reforming. The invention further relates to a method for enhancing aromatization selectivity in such materials by alkali and alkaline earth exchange.

Titanosilicates having the structure of zeolites are known in the art. U.S. Pat. No. 3,329,481 to Young teaches "crystalline titano-silicate zeolites" which are prepared by reacting peroxo alkali metal titanates with alkaline silicate solutions. U.S. Pat. No. 4,329,328 to McAnespie et al teaches a method of preparing titanosilicate material by mixing titanate solution with a source of silica. U.S. Pat. No. 4,410,501 to Taramasso et al discloses "titanium silicalite" designated TS-1 and its use in a wide variety of organic conversion reactions including isomerization of n-paraffins and naphthenes, reforming, and polymerization of compounds containing olefin bonds. The material is prepared from a reaction mixture containing sources of silicon oxide, titanium oxide, alkaline oxide, nitrogenated organic base and water. The titanium oxide source may include hydrolyzable $TiX_4$, where X is selected from the group consisting of F, Cl, Br and I. U.S. Pat. Nos. 4,591,998 and 4,623,526 relate to a process for preparing crystalline titanoborosilicate by reacting titanium-containing compound and an alkali tetra hydroborate, sodium silicate, and alkylammonium cation. These two references also teach exchanging noble metals with the titanoborosilicate. Hydrogen forms of titanoboroslicate are taught as being prepared by calcining and ammonium-exchanging with ammonium chloride, ammonium nitrate ammonium acetate. U.S. Pat. No. 4,576,805 to Chang et al discloses a method for treating porous crystalline silicates by adding framework metals by contacting said silicates with volatile metal compounds, e.g., $TiCl_4$. The above references are incorporated herein by reference. U.S. application Ser. Nos. 138,973 and 138,974, filed contemporaneously with the present application relate to noble metal titanosilicates having the structure of zeolite beta and their use in aromatization reactions.

The present invention relates to a noble metal-containing porous crystalline titanosilicate zeolite which has a high ion exchange capacity and low acidity which can be used in hydrocarbon covnersion processes requiring catalysts of low acidity and high noble metal dispersion.

The present invention also relates to a method for enhancing the ion exchange capacity of porous crystalline titanosilicate materials by treatment with an alkaline medium having a pH ranging from about 7 to about 10.

Generally, catalysts produced by the method of the present invention are particularly useful in any process or combination of processes which employ metal catalyst components such as platinum or palladium, as well as other noble metals. Examples of such processes include hydrogenation, dehydrogenation, dehydrocyclization, isomerization, hydrocracking, dewaxing, reforming, conversion of alkyl aromatics, oxidation, etc. The catalysts of the present invention are believed to be particularly useful in catalytic dewaxing of distillate fuel oils and gas oils wherein waxy components are isomerized by contact with a zeolite beta catalyst, according to the process disclosed in U.S. Pat. No. 4,419,220 to LaPierre et al., incorporated herein by reference. In this process a hydrocarbon feedstock such as distillate fuel oil is dewaxed by contact with a catalyst comprising zeolite beta having a silica to alumina ratio of at least 20 and a hydrogenation component such as platinum, under isomerization conditions. Isomerization conditions may include temperatures of 200° to 540° C. (392° to 1005° F.), preferably 400° to 450° C. (752° to 842° F.), pressures from atmospheric to 25,000 kPa, preferably 4,000 to 10,000 kPa, and a space velocity (LHSV) from 0.1 to 20, preferably from 0.2 to 5.

The present invention is of particular utility in that it can be used to prepare porous crystalline silicates of low acid activity and high ion exchange capacity. The low acidity characteristics are suited to use in hydrocarbon conversion reactions such as isomerization of paraffins, aromatization of aliphatics and oligomerization of olefins. However, such reactions are optimized when a hydrogenation-dehydrogenation component such as noble metal is associated with the porous crystalline silicate. Highly siliceous porous crystalline silicates such as highly siliceous aluminosilicate zeolites exhibit the low acidity desired for such catalysts. However, effecting high dispersion of noble metals by ion exchange capacity is difficult because such materials have low ion exchange capacities, making it difficult to exchange noble metal ions into the zeolite pores near the acid sites. Accordingly, the present invention is particularly useful in that it provides a means for obtaining catalysts capable of a high ion-exchange capacity, which can be exchanged with noble metal ions. The resulting noble metal exchanged products exhibit a high level of noble metal dispersion which results in close proximity of the metal and acid sites. Such proximity is of particular advantage in paraffin isomerization catalysts.

The titanosilicate employed can be any porous crystalline silicate material wherein titanium is present in the framework. A description of such materials and their preparation can be found in the references cited above. Titanosilicates prepared by inserting titanium into an existing framework of a porous crystalline silicate, e.g., by contact with volatile titanium compounds as described in U.S. Pat. No. 4,576,805 or by contact with a liquid phase source of titanium, e.g., $(NH_4)_2TiF_6(aq)$, and $TiF_4(aq)$, are particularly well-suited for use in the present invention.

The FIGURE depicts a plot of cyclohexane sorption of the titanosilicate of Example 3 versus pH.

The noble metal-containing catalysts of the present invention comprise a titanosilicate, such as those having the structure of the novel class of zeolites as defined herein, a noble metal and, optionally, a binder.

For the purpose of this invention, the term "zeolite" is meant to represent the class of porotectosilicates, i.e., porous crystalline silicates that usually contain silicon and oxygen atoms as the major components. Other components may be present in minor amounts, usually less than 14 mole % and preferably less than 4 mole %. These components include aluminum, boron, gallium, iron, phosphorus and the like with aluminum being preferred. The minor components may be present separately or in mixtures. Titanosilicate zeolites contain titanium in the porous crystalline silicate framework and can include one or more of the above-named minor components in the framework as well, preferably aluminum and/or boron.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other forms within the channels. Although zeolites with a silica to alumina mole ratio of at least 12 are useful, it is preferred in some instances to use zeolites having much higher silica to alumina mole ratios. Thus zeolites useful in the present invention can have silica to alumina molar ratios of at least about 20, 25, 70, or in some instances at least 100 or even at least 150.

A particular class of zeolites useful herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross section than normal hexane is excluded and the zeolite is not of the desired type. Windows of 10-membered rings are preferred, although in some instances excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of a particular zeolite solely from theoretical structural considerations.

Rather than attempt to judge from crystal structure whether or not a zeolite possesses the necessary constrained access to molecules of larger cross section than normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. (1005° F.) for at least 15 minutes. The zeolite is then flushed with helium and the temperature is adjusted between 290° C. (555° F.) and 510° C. (950° F.) to give an overall conversion of between 10% and 60%. The mixture of hydrocarbons is passed at 1 liquid hourly space velocity (i.e. 1 volume of liquid hydrocarbon per vlume of zeolite per hour) over the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10% to 60% for most zeolite samples and represents preferred conditions, it may occasionally be necessary to use somewhat more severed conditions for samples of very low activity, such as those having an exceptionally high silica to alumina mole ratio. In those instances, a temperature of up to about 540° C. (1005° F.) and a liquid hourly space velocity (LHSV) of less than one, such as 0.1 or less, can be employed in order to achieve a minimum total conversion of about 10%.

There also may be instances where the activity is so low (i.e., silica to alumina mole ratio approaching infinity) that the Constraint Index cannot be adequately measured, if at all. In such situations, Constraint Index is meant to mean the Constraint Index of the exact same substance (i.e. same crystal structure as determined by such means as X-ray diffraction pattern) but in a measureable form (i.e. aluminum containing form).

The "Constraint Index" is calculated as follows:

$$\text{Constraint Index} = \frac{\log 10(\text{fraction of hexane remaining})}{\log 10(\text{fraction of 3-methylpentane remaining})}$$

The Constraint Index approximates the ratio of the cracking rate constants for the two hydrocarbons. Zeolites suitable for the present invention are those having a Constraint Index in the appropriate range of 0.1 to 12.

Constraint Index (CI) values for some typical materials are:

|  | CI (at test temperature) |
| --- | --- |
| ZSM-4 | 0.5 (316° C.) |
| ZSM-5 | 6–8.3 (371° C.–316° C.) |
| ZSM-11 | 5–8.7 (371° C.–316° C.) |
| ZSM-12 | 2.3 (316° C.) |
| ZSM-20 | 0.5 (371° C.) |
| ZSM-22 | 7.3 (427° C.) |
| ZSM-23 | 9.1 (427° C.) |
| ZSM-34 | 50 (371° C.) |
| ZSM-35 | 4.5 (454° C.) |
| ZSM-48 | 3.5 (538° C.) |
| ZSM-50 | 2.1 (427° C.) |
| TMA Offretite | 3.7 (316° C.) |
| TEA Mordenite | 0.4 (316° C.) |
| Clinoptilolite | 3.4 (510° C.) |
| Mordenite | 0.5 (316° C.) |
| REY | 0.4 (316° C.) |
| Amorphous Silica-alumina | 0.6 (538° C.) |
| Dealuminized Y | 0.5 (510° C.) |
| Erionite | 38 (316° C.) |
| Zeolite Beta | 0.6–2.0 (316° C.–399° C.) |

The above-described Constraint Index is an important and even critical definition of certain porous crystalline silicates which are useful in the instant invention. The very nature of this parameter and the recited technique by which it is determined, however, admit of the possibility that a given porous crystalline silicate can be tested under somewhat different conditions and thereby exhibit different Constraint Indices. Constraint Index seems to vary somewhat with severity of operations (conversion) and the presence or absence of binders. Likewise, other variables, such as crystal size of the porous crystalline silicate, the presence of occluded contaminants, etc., may affect the Constraint Index. Therefore, it will be appreciated that it may be possible to so select test conditions, e.g. temperature, as to establish more than one value for the Constraint Index of a particular porous crystalline silicate. This explains the range of Constraint Indices for some zeolites, such as ZSM-5, ZSM-11 and Beta.

It is to be realized that the above CI values typically characterize the specified porous crystalline silicates, but that such are the cumulative result of several variables useful in the determination and calculation thereof. Thus, for a given material exhibiting a CI value within the range of 1 to 12, depending on the temperature employed during the test method within the aforenoted range of 555° F. (290° C.) to 950° F. (510° C.), with accompanying conversion between 10% and 60%, the CI may vary within the indicated range of 1 to 12. Likewise, other variables such as the crystal size of the material, the presence of possibly occluded contaminants and binders intimately combined with the zeolite may affect the CI. It will accordingly be understood to those skilled in the art that the CI, as utilized herein, while affording a highly useful means for characterizing the materials of interest is approximate, taking into consideration the manner of its determination, with the possibility, in some instances, of compounding variable extremes. However, in all instances, at a temperature within the above-specified range of 555° F. to 950° F., the CI will have a value for any given material of interest herein within the approximate range of 1 to 12.

The particular class of zeolites defined herein is exemplified by zeolite beta, ZSM-5, ZSM-11, ZSM-5/ZSM-11 intermediate, ZSM-12, ZSM-23, ZSM-35, ZSM-48, and other similar materials.

Zeolite beta is described in U.S. Pat. No. 3,308,069.

ZSM-5 is described in U.S. Pat. No. 3,702,886 and Re. No. 29,949. Such descriptions include the X-ray diffraction pattern of the therein disclosed ZSM-5.

ZSM-11 is described in U.S. Pat. No. 3,709,979. That description also includes the particular X-ray diffraction pattern of said ZSM-11.

ZSM-5/ZSM-11 intermediate is described in U.S. Pat. No. 4,229,424.

ZSM-12 is described in U.S. Pat. No. 3,832,449. That description also includes the particular X-ray diffraction pattern of said ZSM-12.

ZSM-23 is described in U.S. Pat. No. 4,076,842 which includes the specification of the X-ray diffraction pattern of the disclosed zeolite.

ZSM-35 is described in U.S. Pat. No. 4,016,245 which includes the X-ray diffraction pattern thereof.

ZSM-48 is described in U.S. Pat. No. 4,234,231 which includes the X-ray diffraction pattern of said ZSM-48. All of the above patents are incorporated herein by reference.

It is to be understood that by citing the foregoing patents as describing examples of specific members of the zeolite class with greater particularity, it is intended that identification of the therein disclosed crystalline zeolites be resolved on the basis of their respective X-ray diffraction patterns. As discussed above, the present invention contemplates utilization of such catalyts wherein the mole ratio of silica to alumina is essentially unbounded. The citation of the identified patents should therefore not be construed as limiting the disclosed crystalline zeolites to those having the specific silica-alumina mole ratios discussed therein, it now being known that such zeolites may contain very low amounts of aluminum and yet, having the same crystal structure as the disclosed materials, may be useful or even preferred in some applications. It is the crystal structure, as identified by the X-ray diffraction "fingerprint", which establishes the identity of the specific crystalline zeolite material.

Other zeolites having a constraint index less than 1 and suitable for use in the present invention include larger pore size zeolites such as zeolite X, zeolite Y, ZSM-3, ZSM-4, ZSM-18 and ZSM-20.

Zeolite X is described in greater detail in U.S. Pat. No. 2,882,244, incorporated herein by reference.

Zeolite Y is described in greater detail in U.S. Pat. No. 3,130,007. The entire description contained within this patent, particularly the X-ray diffraction pattern of therein disclosed Zeolite Y, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

As is the case of many catalysts, it is desired to incorporate the zeolite with another material resistant to the temperatures and other conditions employed in organic conversion processes. Such materials include active and inactive materials as well as inorganic materials such as clays, silica and/or metal oxides. Inactive materials suitably serve as diluents to control the amount of conversion in a given process so that products can be obtained economically without employing other means for controlling rate of reaction. Binders useful for compositing with the useful zeolite herein also include inorganic oxides, notably alumina, which is particularly preferred.

In addition to the foregoing material, the zeolite catalyst can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The relative proportions of finely divided crystalline zeolite and inorganic oxide matrix may vary widely with the zeolite content ranging from about 1 to about 90 percent by weight, and more usually in the range of about 10 to about 50 percent by weight of the composite.

The catalysts of the present invention can be prepared by contacting the titanosilicate with an aqueous alkaline solution having a pH ranging from about 7 to about 10, preferably from about 8 to about 9.5 in order to increase the ion exchange capacity of the titanosilicate. The upper limit of the pH range is based upon the alkalinity the titanosilicate can endure without significant crystallinity loss (say, e.g., less than about 20% loss).

Prior to said treatment with aqueous alkaline solution the titanosilicate can be calcined at temperatures of about 400° to 500° C. in either inert atmosphere, e.g., He, Ar, $N_2$ or in an oxygen-containing atmosphere such as air.

The alkaline aqueous solution may contain any alkaline agent capable of achieving the required pH range, provided it does not introduce cations which will interfere with noble metal exchange. Such materials include sources of ammonium ion, such as gaseous ammonia, bubbled into the aqueous solution, ammonium nitrate, ammonium carbonate, ammonium salts, and ammonium hydroxide. Exposure to said aqueous basic solution is carried out under conditions suitable for effecting an increase in ion exchange capacity say, for example, temperatures of about 20° C. to about 80° C. for periods of about 0.5 to 24 hours. The resulting titanosilicates can have an ion exchange capacity of at least about 0.022 meq/g ash, preferably at least about 0.066 meq/g ash. These materials may also exhibit reduced acidic activity, say an alpha value of less than about 50, or even less than about 20. The alpha test is described in U.S. Pat. No. 3,354,078, J. Catalysis 4, 527 (1965), J. Catalysis 6, 278 (1966), and J. Catalysis 61, 395 (1980), all of which are incorporated herein by reference. Preferably, alpha value is determined at a fixed temperature of 538° C.

After the aforesaid alkaline treatment, the titanosilicate, having enhanced ion exchange capacity, can be contacted with a source of noble metal to prepare a noble metal-containing titanosilicate of high noble metal dispersion. Preferably, such contacting occurs with a solution comprising an ionizable compound of a noble metal, e.g., platinium or palladium, for a sufficient period of time to effect deposition, on the crystalline structure of the zeolite, of a noble metal-containing ion derived from such a solution, drying the resulting product and optionally subjecting the same to an activating treatment.

The noble metals which can be incorporated in the present catalyst composition include those having atomic numbers 44 to 47 and 76 to 79 inclusive, namely platinum, palladium, ruthenium, osmium, iridium, rhodium, silver and gold. Of this group, platinum and palladium are accorded preference. Each of the noble metals may occur in a variety of compounds for example, compounds containing the platinum ammine complex. The compounds of the useful moble metals can be ionizable noble metal compounds in which the metal is in the cationic state, i.e. in the form of a cation of cation complex, since with such compounds exchange of the original metal ion contained in the metal aluminosilicate crystalline zeolite with the platinum metal-containing cation is readily achieved.

A wide variety of metallic compounds can be employed with facility as a source of noble metal cations and include both inorganic and organic salts of the noble metals. Representative of the salts which can be employed are chlorides, bromides, iodides, carbonates, bicarbonates, sulfates, sulfites, sulfides, chlorates, perchlorates, thionates, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartarates and the like. The only limitation is that the salt be sufficiently soluble in the fluid medium to give the necessary ion transfer.

It is contemplated that water will ordinarily be the solvent in the noble metal-containing solutions used. However, it will be understood that other solvents, although generally less preferred, may also be used. Thus, in addition to aqueous solutions, alcoholic solutions, etc., of the noble metal-containing compounds may be employed in the present process. The compounds of the noble metals undergo ionization in the particular solvent used. The concentration of the noble metal compound in the solution employed may vary widely depending on the amount of noble metal desired in the final catalyst composition and on the conditions under which contact between the crystalline zeolite and such solution is effected. Other conditions being equal, a shorter time of contact between the crystalline zeolite and noble metal-containing solution may be used with the more concentrated solutions, while a longer period of contact is required with the more dilute solutions.

The solutions of noble metal compound may be contacted with the porous crystalline titanosilicate in the form of either a fine powder, a compressed pellet or an extruded pellet. When in the form of a pellet, the crystalline titanosilicate may be combined with a suitable binder such as clay. The crystalline titanosilicate, initially free of noble metal has rigid three dimensional networks characterized by uniform interstitial dimensions sufficiently large to permit introduction by ion exchange of a noble metal-containing ion. The metal originally contained in the titanosilicate will generally be an alkali or alkaline earth metal, e.g., sodium or calcium, although these may be replaced at least in part by other ions which do not ordinarily affect the crystalline structure such as for example silver, lithium, potassium, magnesium, cobalt and also ammonium ions.

Good noble metal dispersion (i.e., small noble metal crystallite size, less than about 20 angstroms or even less than about 10 angstroms) is an important property for satisfactory performance of noble metal-containing titanosilicate catalyst material. The present invention is suitable for preparing noble metal-containing catalysts having noble metal dispersion, as measured by hydrogen chemisorption, hydrogen to noble metal ratio, e.g., H/Pt, of at least about 0.75 preferably at least about 1.0. Conventional volumetric chemisorption techniques which are employed to measure hydrogen chemisorption are discussed in *Structure of Metallic Catalysts*, J. R. Anderson, Academic Press, 1975, Chapter 6, incorporated herein by reference.

The volume of solution containing noble metal compound may be just sufficient to be adsorbed by the crystalline titanosilicate. Generally, however, an excess of solution is employed and such excess is removed from contact with the crystalline titanosilicate after a suitable period of contact and prior to drying. The time of contact between the solution of noble metal compound and crystalline material is such as to effect deposition on the crystalline structure of the noble metal-containing ion derived from such solution. It will be appreciated that such period of contact may vary widely depending on the temperature of the solution, the nature of crystalline material used, the particular noble metal compound employed, and the concentration of noble metal desired in the final catalyst. Thus, the time of contact may extend from a very brief period of the order of minutes for small particles to long periods of the order of days for large pellets. Generally, the time of contact will, depending on the various aforementioned factors, be within the range of 5 minutes to 10 days. The temperature of the solution will ordinarily be room temperature, but may be an elevated temperature below the boiling point of the solution.

After the contact period, the crystalline titanosilicate is removed from the noble metal compound solution. Excess noble metal compound and foreign salt, if employed, are removed, suitably by washing with water. The resulting material is then dried, generally in air, to remove substantially all of the water therefrom.

The noble metal catalyst of this invention contains noble metal deposited on the porous crystalline titanosilicate. The concentration of noble metal in the finished catalyst may vary depending on the use for which such catalyst is intended. The content of noble metal in the finished catalyst is generally within the approximate range of 0.001 to 5 percent by weight, preferably between about 0.05 and 2 weight percent, say about 0.6 weight percent.

While not wishing to be bound by theory, it is believed that the increased ion-exchange capacity resulting from contact with aqueous alkaline solution is believed to result from coordination of framework ($Ti^{+4}$—$O_4$—) sites with $OH^-$ to form a 5-coordinate ($Ti^{+4}$—$O_4$—$OH^-$) site making Ti an exchange site. Such ion exchange activity based on $Ti^{+4}$, which was believed unexchangeable, is unexpected.

The invention can be further described by the following Examples.

EXAMPLE 1

A sample of zeolite beta containing framework boron having the following characteristics:
0.66 wt% B
0.67 wt% $Al_2O_3$
$SiO_2/Al_2O_3 = 250:1$
$SiO_2/B_2O_3 + Al_2O_3 = 44:1$,
was treated with $TiCl_4$ vapor in $N_2$ for 6 hours at 350° C. It was flushed with $N_2$ for 18 hours then clacined in air at 538° C. for 2 hours. The material was then exchanged twice with 1M $NH_4NO_3$, 50 ml/g, for 1 hour at 25° C. The number of cation exchange sites, measured by thermogravimetric ammonia desorption method disclosed in B. Gates, J. Katzer and G. C. A. Schuit, Chemistry of Catalytic Processes, McGraw Hill, N.Y. (1979), p. 19, ($NH_3$-TPD), had decreased after $TiCl_4$ treatment from 0.5929 meq/g ash to 0.1917 meq/g ash. Table 1 sets out the analysis results for this material.

1 gram of the resulting titanosilicate was added to a solution of 0.055M $Na_2SO_3$ at pH=9.2 for 1 hour at 25° C. The material was then exchanged twice with 1M $NH_4NO_3$, 50 ml/g, at 25° C. for 1 hour. The cation exchange capacity as measured by $NH_3$-TPD increased from 0.1917 meq/g ash to 0.8207 meq/g ash. $T_{max}$ of $NH_3$ desorption is related to the acid strength of zeolite materials. The $T_{max}$ of the resulting product was 197° C. The $T_{max}$ of the boron zeolite beta starting material was 180° C.; and after $TiCl_4$ treatment $T_{max}$ was 202° C.

EXAMPLE 2

A sample of zeolite beta having a $SiO_2/Al_2O_3$ mole ratio of about 40:1 was treated with $TiCl_4$ vapor in $N_2$ for 6 hours at 350° C. and flushed with $N_2$ for 18 hours and calcined in air at 538° C. for 2 hours. The material was then exchanged twice with 1M $NH_4NO_3$, 50 ml/lg, for 1 hour at 25° C. The number of cation exchange sites, measured by $NH_3$-TPD, had decreased from 0.4966 meq/g ash to 0.2040 meq/g ash, as expected due to substitution of $Ti^{+4}$ for $Al^{+3}$ in the framework.

1 gram of the titanosilicate was added to a solution of 0.015M $Na_2SO_3$ at pH=9.5 for 1 hour at 25° C. The material was then exchanged twice with 1M $NH_4NO_3$, 50 ml/g, at 25° C. for 1 hour. The cation exchange capacity increased to 1.0724 meq/g ash.

EXAMPLE 3

The porous crystalline silicate having the structure of zeolite beta and containing framework boron set out in Example 1 was treated by passing $TiCl_4(g)$ over boron zeolite beta at 450° C. for 4 hours and then air calcining at 538° C. for 2 hours. The Ti-zeolite beta was suspended in 1M $NH_4NO_3$, 50 ml/g, at pH=9.5 and room temperature for 1 hour then filtered, washed and dried. The exchange capacity increased by 0.6036 meq/g ash to about 0.8207 meq/g ash; there was no change in the $NH_3$-TPD $T_{max}$, 202° C. The reaction was studied at pH=7, 8, 9, 10, 11 and 12; the pH was adjusted with $NH_4OH$. At pH values greater than 9.5 the cyclohexane sorption capacity decreased as shown in FIG. 1, indicating a loss of zeolite crystallinity. The Ti-zeolite Beta was suspended in 1M $NH_4NO_3$, 50 ml/g, at pH=9.5. To this solution $Pt(NH_3)_4(NO_3)_2$ dissolved in deionized water was added dropwise at room temperature. The sample was then filtered and dried followed by air calcination at 350° C. The metal dispersion was measured by conventional volumetric chemisorption techniques as described in "Structure of Metallic Catalysts", J. R. Anderson, Academic Press, 1975, Chapter 6. The H/Pt for the catalyst in this example was 1.6.

$NH_3$-TPD results for the products of Examples 1 and 3 are given in Table 2 below.

TABLE 1

Physical Characterization of Ti—Zeolite Beta

| Elemental Analysis | | |
|---|---|---|
| | Wt % | meq/g ash |
| B | 0.29 | 0.2636 |
| Al | 0.67 | 0.1314 |
| Ti | 3.04 | 0.6346 |

| $NH_3$—TPD Analysis | |
|---|---|
| Exchange Capacity | 0.1917 |
| $SiO_2/Al_2O_3 + B_2O_3$ | 172:1 |
| $T_{max}$, °C. | 202 |

TABLE 2

$NH_3$—TPD Results for the Reaction of Ti—Zeolite Beta with $SO_3^{-2}$ and $OH^-$

| Reactant | meq/g ash | T, °C. |
|---|---|---|
| | Initial | |
| $SO_3^{-2}/OH^-$ | 0.1917 | 202 |
| $OH^-/1$ M $NH_4NO_3$, pH = 9.5 | 0.1917 | 202 |
| | Final | |
| $SO_3^{-2}/OH^-$ | 0.8207 | 196 |
| $OH^-/1$ M $NH_4NO_3$, pH = 9.5 | 0.7953 | 202 |

EXAMPLE 4

ZSM-5 having a silica to alumina mole ratio of 500:1 is treated with both $TiCl_4(g)$ and then alkaline aqueous solution, according to the procedure set out in Example 3 at a pH of 9. The exchange capacity increases by 0.2610 meq/g ash to about 0.3275 meq/g ash.

It is claimed:

1. A method for increasing the ion exchange capacity of a titanosilicate without increasing acid activity of said titanosilicate which comprises contacting said titanosilicate with an aqueous alkaline solution having reactant anions selected from the group consisting of $SO_3^{-2}/OH^-$ and $OH^-/NH_4NO_3$ and having a pH ranging from about 7 to about 10 "under conditions effective to increase said ion exchange capacity without increasing acid activity".

2. The method of claim 1 wherein said pH ranges from about 8 to about 9.5.

3. The method of claim 1 wherein said titanosilicate has the structure of a zeolite selected from the group consisting of zeolite beta, ZSM-5, ZSM-5/ZSM-11 intermediate, ZSM-11, ZSM-12, ZSM-23, ZSM-35, ZSM-48 and ZSM-50.

4. The method of claim 1 wherein said titanosilicate has a structure selected from the group consisting of zeolite X, zeolite Y, ZSM-3, ZSM-4, ZSM-18 and ZSM-20.

5. The method of claim 1 wherein said titanosilicate has the structure of zeolite beta.

6. The method of claim 1 wherein said titanosilicate contains a framework element selected from the group consisting of aluminum, boron, iron, gallium, and phosphorus.

7. The method of claim 1 wherein said titanosilicate contains framework aluminum.

8. The method of claim 1 wherein said titanosilicate contains framework boron.

9. The method of claim 1 wherein said titanosilicate is prepared from a porous crystalline silicate which has been contacted with volatile $TiX_4$ where X is selected from the group consisting of F, Cl, Br, and I.

10. The method of claim 9 wherein said $TiX_4$ is $TiCl_4$.

11. The method of claim 7 wherein said titanosilicate has a silica to alumina molar ratio of at least about 100.

12. The method of claim 7 wherein said titanosilicate has a silica to alumina molar ration of at least about 150.

13. The method of claim 1 wherein said titanosilicate of increased ion exchange capacity is contacted with a source of noble metal.

14. The method of claim 13 wherein said noble metal is platinum.

* * * * *

UNITED STATES PATENT AND TRADEMARK OFFICE
CERTIFICATE OF CORRECTION

PATENT NO. : 4,828,812

DATED : May 9, 1989

INVENTOR(S) : S.B. McCullen et al

It is certified that error appears in the above-identified patent and that said Letters Patent is hereby corrected as shown below:

Col. 1, line 33, "4,591,998" should be —4,519,998—.

Col. 1, line 39, "titanoboroslicate" should be —titanoborosilicate—.

Col. 1, line 55, "covnersion" should be —conversion—.

Col. 4, line 1, "severed" should be —severe—.

Col. 7, line 41, "of" (second occurrence) should be —or—.

Col. 9, line 30, "clacined" should be —calcined—.

Col. 12, claim 12, line 13, "ration" should be —ratio—.

Signed and Sealed this

Twenty-third Day of January, 1990

Attest:

JEFFREY M. SAMUELS

Attesting Officer     Acting Commissioner of Patents and Trademarks